United States Patent [19]

Lee, Jr.

[11] Patent Number: 4,684,682

[45] Date of Patent: Aug. 4, 1987

[54] FLAME RETARDANT FLEXIBILIZED POLYPHENYLENE ETHER COMPOSITIONS

[75] Inventor: Gim F. Lee, Jr., Albany, N.Y.

[73] Assignee: General Electric Company, Selkirk, N.Y.

[21] Appl. No.: 603,663

[22] Filed: Apr. 26, 1984

Related U.S. Application Data

[63] Continuation of Ser. No. 197,933, Oct. 17, 1980, abandoned.

[51] Int. Cl.[4] ............................................. C08K 5/52
[52] U.S. Cl. .................................................... 524/141
[58] Field of Search ......................................... 524/141

[56] References Cited

U.S. PATENT DOCUMENTS

| | | | |
|---|---|---|---|
| 3,563,939 | 2/1971 | Stevens | 260/37 N |
| 3,639,508 | 2/1972 | Kambour | 260/876 B |
| 3,723,383 | 3/1973 | Cyba | 260/45.75 B |
| 4,002,701 | 1/1977 | Katchman | 260/876 B |

Primary Examiner—Paul R. Michl
Attorney, Agent, or Firm—Hedman, Gibson, Costigan & Hoare

[57] ABSTRACT

There are provided flame retardant, flexibilized thermoplastic compositions which comprise, in admixture, a normally flammable polyphenylene ether resin, an aromatic phosphate plasticizer in an amount at least sufficient to provide a flame retardant, flexibilized composition after molding, and a thermoplastic elastomer comprising a block copolymer of a vinyl aromatic compound and a diene monomer. Preferred features comprise such compositions which also include a halogenated hydrocarbon, alumina trihydrate and/or elemental red phosphorus.

2 Claims, No Drawings

4,684,682

FLAME RETARDANT FLEXIBILIZED POLYPHENYLENE ETHER COMPOSITIONS

This is a continuation of application Ser. No. 197,933 filed Oct. 17, 1980 abandoned.

The present invention relates to flame retardant, flexibilized thermoplastic polyphenylene ether compositions. The compositions of this invention comprise the polyphenylene ether, an aromatic phosphate and a thermoplastic elastomer such as A-B-A$^1$ block copolymers, e.g., polystyrene-polybutadiene-polystyrene, and optionally, a halogenated hydrocarbon resin, alumina trihydrate and/or elemental red phosphorus.

BACKGROUND OF THE ART

The polyphenylene ether resins are well known in the art as a class of thermoplastics which possess a number of outstanding physical properties. They can be prepared, in general, by oxidative and non-oxidative methods, such as are disclosed, for example, in Hay, U.S. Pat. Nos. 3,306,874 and 3,306,875 and Stamatoff, U.S. Pat. Nos. 3,257,357 and 3,257,358, which are incorporated herein by reference.

It is known that the polyphenylene ether resins alone are somewhat difficult to fabricate because of their high temperature thermoplastic molding characteristics and this has limited their use in applications where flexibility, such as the need to calendar into relatively thin sheets, without cracking or crazing, is desirable.

In recent years, there has also been increasing concern about the performance and safety of thermoplastic materials, including the afore-mentioned polyphenylene ether compositions during real-life fire situation.

Of particular interest would be a polyphenylene ether composition which is both flexibilized and flame retardant without loss of desirable properties.

It is known that flexible polyphenylene ether blends have been made with fairly high loadings of plasticizers. It has now been found that the capabilities and alternatives in making such blends can be greatly expanded by incorporating rubber in the form of a block copolymer into such blends, and further that if the flexibilizer is predominately an aromatic phosphate, good self-extinguishing properties are obtained.

Based on the foregoing discovery, it has also been found possible to further modifiy the blends to make them somewhat less costly, without loss of other beneficial properties, by replacing some of the aromatic phosphate with a halogenated hydrocarbon resin, e.g., chlorinated paraffin. Complete replacement of the aromatic phosphate is not possible, however, without loss of flame resistance.

Furthermore, based on the foregoing discovery, it has also been found possible to decrease the cost of the formulation, without introducing a halogen source, and at the same time, improve the self-extinguishing properties. This discovery comprises including alumina trihydrate in the composition.

Finally, based on the foregoing discovery, it has also been found possible to use higher levels of thermoplastic elastomer without disrupting flame retardant properties and still keeping a halogen-free system by the addition to the composition of elemental red phosphorus.

In addition to being useful by themselves, the new compositions are useful in blends with other resins and elastomers to improve flame retardancy. Of course, conventional additives such as pigments, fillers, stabilizers, and the like, can be used with the new compositions of this invention.

DESCRIPTION OF THE INVENTION

Accordingly, the present invention provides in its broadest aspects, a flame retardant flexibilized thermoplastic composition which comprises, in admixture:

(a) a normally flammable polyphenylene ether resin;

(b) a flame retardant aromatic phosphate plasticizer in an amount at least sufficient to provide a flexibilized composition after molding; and (c) a thermoplastic elastomer comprising an A-B-A$^1$ block copolymer wherein terminal blocks A and A$^1$ are polymeric units of a vinyl aromatic compound and center block B is a polymer of a conjugated diene.

As employed herein, the term "flexibilized" is used in its art-recognized sense to define compositions which are calenderable into relatively thin sheets, e.g., 174 inch or less in thickness, which can be bent without causing cracking or crazing. Such thermoplastic compositions are suitable, in appropriately thin forms, for products such as shower curtains, wall coverings, automotive upholstery, and the like.

The term "normally flammable" as used herein, describes compositions which do not meet the V-0 and V-1 requirements of the Underwriters' Laboratories Bulletin No. 94 test.

In a preferred feature, the new compositions will also include:

(d) a minor proportion of flame retardant halogenated plasticizer based on the amount of aromatic phosphate component (b). Especially preferred halogenated hydrocarbons are chlorinated paraffins. The amount can vary, but up to equal parts by weight, 50:50, based on the aromatic phosphate are preferred, and 50:50 is most economical. A useful chlorinated paraffin is available from ICI America, Inc., under the designation Creclor S-45.

Another preferred feature is the new composition which also includes:

(e) a minor proportion of alumina trihydrate, sufficient to enhance the flame retardant capability of aromatic phosphate component (b). The amount can vary widely within these limits but preferably, the amount of alumina trihydrate (which is a standard item of commerce), comprises from about 5 to about 40 parts by weight per 100 parts by weight of components (a) and (b) combined.

Still another preferred feature is the new composition which also includes:

(f) a minor proportion of elemental red phosphorus, sufficient to enhance the flame retardant capability of aromatic phosphate component (b). Elemental red phosphorus can be used in fairly broad ranges in amount but preferably, it will comprise from about 1 to about 10 parts by weight per 100 parts by weight of components (a), (b) and (c) combined.

The normally flammable polyphenylene ether resin (a) is preferably of the type having the structural formula:

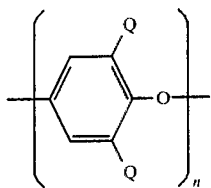

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

A more preferred class of polyphenylene ether resins for the compositions of this invention includes those of the above formula wherein each Q is alkyl, most preferably, having from 1 to 4 carbon atoms. Illustratively, members of this class include poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like.

Especially preferred is poly(2,6-dimethyl-1,4-phenylene)ether, preferably, having an intrinsic viscosity of about 0.45 deciliters per gram (dl./g.) as measured in chloroform at 30° C.

The choice of an aromatic phosphate plasticizer can vary broadly.

The phosphate plasticizer is preferably a compound of the formula:

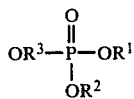

wherein $R^1$, $R^2$ and $R^3$ are the same or different and are aryl, alkyl substituted aryl, or hydroxyalkyl. To keep the amount of halogen low, it is preferred that no halogen be present in component (b).

Examples include cresyl diphenyl phosphate, tricresyl phosphate, triiosopropylphenyl phosphate, triphenyl phosphate, cresyl diphenyl phosphate, or mixtures thereof. Especially preferred is triphenyl phosphate.

Commercially available aromatic phosphates which have been found to be particularly useful are FMC Corporations's Kronitex 50 and Kronitex 300, which are isopropylated triphenyl phosphate compounds.

The plasticizer (b) is added in amounts which will be sufficient to provide a flexibilized composition within the meaning of the term described above. In general, the plasticizer is present in amounts ranging from at least about 10 to 100, preferably from about 15 to about 65 parts by weight of plasticizer, per 100 parts of resin component (a).

The present compositions also include thermoplastic elastomers (c), which are A-B-A$^1$ block copolymers. In general, these resins comprise a polymerized center block B which is derived from a conjugated diene, e.g., butadiene, isoprene, 1,3-pentadiene, and the like, and polymerized terminal blocks A and A$^1$ which are derived from vinyl aromatic, e.g., styrene compounds, such as styrene, α-methyl styrene, vinyl toluene, vinyl xylene, vinyl naphthalene, and the like. Preferably, the A-B-A$^1$ block copolymer will have terminal blocks A and A$^1$ comprised of polystyrene and a center block comprised of polybutadiene.

The linear A-B-A$^1$ block copolymers are made by an organometallic initiated polymerization process using, for example, sodium or lithium metal or an organic derivative thereof. The diene monomers can be polymerized with a monofunctional or difunctional initiator, as is described in Kennedy et al, Interscience Publishers, Vol. 23, Part II (1969), pages 553-449. Other methods of preparing these block copolymers are described in Zelinski, U.S. Pat. No. 3,251,905 and Holden et al, U.S. Pat. No. 3,231,635, the disclosures of which are incorporated herein by reference to save unnecessary detail.

Commercially available A-B-A$^1$ block copolymers include Kraton X4119, poly(styrene-butadiene-styrene) with 20% mineral oil, and the Kratons designated as K-1101 (polystyrene-polybutadiene-polystyrene), K-1102 (polystyrene-polybutadiene-polystyrene), and K-1107 (polystyrene-polyisoprene-polystyrene), all from Shell Chemical Company, Polymers Division.

Hydrogenated A-B-A$^1$ block copolymers can also be used as thermoplastic elastomers in the present compositions. These are prepared by techniques which are well known in the art. See, for instance, the disclosure in Jones, U.S. Pat. No. 3,431,323, which is incorporated herein by reference. A preferred commercially available copolymer of this type is Shell Chemical's KG-6521 resin.

The thermoplastic elastomer (c) can vary broadly in amount, but generally is present in amounts from about 10 to about 100, more preferably from about 15 to about 65 parts by weight of thermoplastic elastomer per 100 parts of polyphenylene ether (a).

Other ingredients, such as fillers, reinforcements, pigments, stabilizers, lubricants, and the like, may be added for their conventional purposes.

The manner in which the present compositions are prepared is not critical and conventional methods can be employed. Preferably, however, each of the ingredients is added as part of a blend premix, and the latter is passed through an extruder, e.g., a 28 mm. WP twin screw extruder, at an extrusion temperature of from about 350° to about 550° F., dependent on the needs of the particular composition. The strands emerging from the extruder may be cooled, chopped into pellets, and molded or calendered to any desired shape.

DESCRIPTION OF THE PREFERRED EMBODIMENTS

The following examples are illustrative of the compositions of this invention. They are not intended to limit the invention in any manner.

EXAMPLES 1-10

The following blends were prepared in a 28 mm Werner Pfleiderer twin screw extruder and tested for physical properties and flame retardancy by the Underwriters' Laboratory U.L. 94 test and the GE Oxygen Index Test, with results set forth in Table 1:

TABLE 1

Flexibilized Polyphenylene Styrene Compositions Comprising Aromatic Phosphates and A—B—A$^1$ Block Copolymers

| Example | A[a] | 1 | 2 | 3 | 4 | 5 | 6 | 7 | 8 | 9 | 10 |
|---|---|---|---|---|---|---|---|---|---|---|---|
| Composition (parts by weight) | | | | | | | | | | | |
| (a) poly(2,6-dimethyl-1,4-phenylene)ether | 60 | 60 | 60 | 60 | 60 | 60 | 60 | 55 | 55 | 55 | 55 |
| (b) aromatic phosphate[b] | — | — | — | — | — | — | — | 45 | 45 | 45 | 45 |
| aromatic phosphate[c] | 40 | 40 | 40 | 40 | 40 | 40 | 40 | — | — | — | — |
| (c) thermoplastic elastomer block copoly(styrene-butadiene-styrene)[d] | — | 20 | 40 | 60 | 80 | 100 | — | 25 | — | — | — |
| block copoly(styrene-butadiene styrene)[e] | — | — | — | — | — | — | 100 | — | 25 | — | — |
| block copoly(styrene-isoprene-styrene)[f] | — | — | — | — | — | — | — | — | — | 25 | — |
| hydrogenated block copoly-(styrene-butadiene styrene)[g] | — | — | — | — | — | — | — | — | — | — | 25 |
| Properties | | | | | | | | | | | |
| Tensile yield, psi | 6300 | 3700 | 3000 | 2100 | 2000 | 1800 | 700 | 2000 | 1300 | 1600 | 1500 |
| Elongation, % | 66 | 60 | 71 | 74 | 51 | 59 | 135 | 65 | 67 | 71 | 77 |
| U.L. flame self-extinguishing times, sec./sec. | 1/drip | 1/1 | 10/10 | 12/24 | 35/15 | drip | drip | 1/2 | 1/4 | 1/3 | 2/3 |
| Oxygen index, % | — | — | — | — | — | — | — | 34 | 31 | 31 | 31.5 |

[a]Control Experiment
[b]FMC±Kronitex 50
[c]FMC±Kronitex 300
[d]Shell Chemical's Kraton 1101
[e]Shell Kraton 1102
[f]Shell Kraton 1107
[g]Shell Kraton G6521

It is of particular interest to note that in the above flexible blends which contain an aromatic phosphate as the plasticizer, good self-extinguishing properties are obtained. Thus, the present compositions, particularly those containing between 20 and 80 parts by weight of A-B-A$^1$ block copolymer per 100 parts by weight of polyphenylene ether and aromatic phosphate, are flame retardant without the chance to produce toxic and corrosive halogen-derived products on incineration.

EXAMPLES 11 AND 12

Following the procedure of Examples 1–10, the listed compositions are prepared, having the properties set forth in Table 2:

TABLE 2

Compositions Comprising Polyphenylene Ethers, Aromatic Phosphates, A—B—A$^1$ Block Copolymer and Halogenated Hydrocarbon Resin

| Example | 11[a] | 12 | B[e] |
|---|---|---|---|
| Composition (parts by weight) | | | |
| (a) poly(2,6-dimethyl-1,4-phenylene)ether | 60 | 60 | 60 |
| (b) aromatic phosphate[a] | 40 | 20 | — |
| (c) thermoplastic elastomer block copoly(styrene-butadiene-styrene)[b] | 43 | 43 | 43 |
| (d) chlorinated paraffin[d] | — | 20 | 40 |
| Properties | | | |
| Tensile yield, psi | 1700 | 2200 | 2000 |
| Elongation, % | 70 | 156 | 160 |
| U.L. flame self-extinguishing times, sec./sec. | 19/24 | 28/26 | 41 drips flaming resin |
| Oxygen index, % | 32 | 30.5 | 21 |

[a]Control Experiment in the sense that all flame retardancy is conferred by aromatic phosphate (b).
[b]FMC's aromatic phosphate Kronitex 50, which is an isopropylated triphenyl phosphate.
[c]Shell Chemical's Kraton 1102.
[d]ICI America Inc.'s Creclor S-45, which is a chlorinated paraffin.
[e]Control Experiment It is noteworthy that in these compositions, complete replacement of the aromatic phosphate by chlorinated paraffin is catastrophic to the flame resistance, whereas up to 50% replacement is only slightly detrimental.

EXAMPLES 13–15

Following the procedure of Examples 1–10, the listed compositions are prepared, having the properties set forth in Table 3:

TABLE 3

Compositions Comprising Polyphenylene Ethers, Aromatic Phosphates, A—B—A$^1$ Block Copolymer and Alumina Trihydrate

| Example | 11[a] | 13 | 14 | 15 |
|---|---|---|---|---|
| Composition (parts by weight) | | | | |
| (a) poly(2,6-dimethyl-1,4-phenylene)ether | 60 | 60 | 60 | 60 |
| (b) aromatic phosphate[b] | 40 | 40 | 40 | 40 |
| (c) thermoplastic elastomer block copoly(styrene-butadiene-styrene)[c] | 43 | 43 | 43 | 43 |
| (d) alumina trihydrate | — | 10 | 20 | 30 |
| Properties | | | | |
| Tensile yield, psi | 1700 | 2000 | 1700 | 1700 |
| Elongation, % | 70 | 53 | 57 | 51 |
| U.L. flame self-extinguishing times, sec./sec. | 19/24 | 11/11 | 3/11 | 2/6 |
| Oxygen index, % | 32 | 29 | 30 | 31 |

[a]Control Experiment in the sense that no alumina trihydrate is used.
[b]FMC's aromatic phosphate Kronitex 50, which is an isopropylated triphenyl phosphate.
[c]Shell Chemical's Kraton 1102.

It is seen that the properties can be retained with significant cost advantages by addition of alumina trihydrate.

EXAMPLES 16–17

Following the procedure of Examples 1–10, the listed compositions are prepared, having the properties set forth in Table 4:

TABLE 4

Compositions Comprising Polyphenylene Ethers,
Aromatic Phosphates, A—B—A¹ Block
Copolymer and Elemental Red Phosphorus

| Example | C[a] | 16 | 17 |
|---|---|---|---|
| Composition (parts by weight) | | | |
| (a) poly(2,6-dimethyl-1,4-phenylene)ether | 30 | 30 | 30 |
| (b) aromatic phosphate[b] | 30 | 30 | 30 |
| (c) thermoplastic elastomer block copoly(styrene-butadiene styrene)[c] | 40 | 40 | 40 |
| (d) elemental red phosphorus | — | 2 | 5 |
| Properties | | | |
| Tensile strength, psi | 1700 | 1700 | 1600 |
| Elongation, % | 106 | 127 | 126 |
| U.L. flame self-extinguishing time, sec./sec. | 18/25 | 4/4 | 1/8 |

[a]Control Experiment in the sense that no elemental red phosphorus is present.
[b]FMC's aromatic phosphate Kronitex 50, which is an isopropylated triphenyl phosphate.
[c]Shell Chemical's Kraton 1102.

It is seen that red phosphorus permits the incorporation of high amounts of rubber, while maintaining good flame retardant characteristics. These compositions also have the desirable feature of being free of halogen.

Obviously, other modifications and variations of the present invention are possible in the light of the above description. It is, therefore, to be understood that changes may be made in the particular embodiments disclosed herein which are within the full intended scope of the invention as defined in the appended claims.

I claim:

1. A flame retardant thermoplastic composition which comprises, in admixture:
   (a) a normally flammable polyphenylene ether resin;
   (b) a flame retardant aromatic phosphate plasticizer in an amount at least sufficient to provide a flexibilized composition after molding; and
   (c) a thermoplastic elastomer comprising an A-B-A¹ block copolymer wherein terminal blocks A and A¹ are polymeric units of a vinyl aromatic compound and center block B is a polymer of a conjugated diene which also includes:
   a minor proportion of elemental red phosphorus, sufficient to enhance the flame retardant capability of aromatic phosphate component (b).

2. A composition as defined in claim 1 wherein the amount of elemental red phosphorus comprises from about 1 to about 10 parts by weight per 100 parts by weight of components (a), (b) and (c) combined.

* * * * *